US009438352B2

(12) United States Patent
Zeng

(10) Patent No.: US 9,438,352 B2
(45) Date of Patent: Sep. 6, 2016

(54) QPSK SIGNAL CONJUGATE RELATIONSHIP IDENTIFICATION METHOD AND APPARATUS, AND DISPERSION COMPENSATION METHOD AND SYSTEM

(71) Applicant: Huawei Technologies Co., Ltd., Shenzhen, Guangdong (CN)

(72) Inventor: Jiahong Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 107 days.

(21) Appl. No.: 14/482,911

(22) Filed: Sep. 10, 2014

(65) Prior Publication Data

US 2015/0132014 A1 May 14, 2015

(30) Foreign Application Priority Data

Sep. 12, 2013 (CN) .......................... 2013 1 0416618

(51) Int. Cl.
*H04B 10/564* (2013.01)
*H04B 10/2513* (2013.01)
*H04B 10/50* (2013.01)
*H04B 10/556* (2013.01)

(52) U.S. Cl.
CPC ...... *H04B 10/564* (2013.01); *H04B 10/25133* (2013.01); *H04B 10/50575* (2013.01); *H04B 10/5561* (2013.01)

(58) Field of Classification Search
CPC ............ H04B 10/5561; H04B 10/564; H04B 10/50575; H04B 10/25133
USPC .......................................... 398/188
See application file for complete search history.

(56) References Cited

U.S. PATENT DOCUMENTS

| 5,805,321 A | 9/1998 | Ooi et al. |
| 2007/0036555 A1* | 2/2007 | Chen .................. H04B 10/6165 398/188 |
| 2010/0128336 A1 | 5/2010 | Witzens et al. |
| 2010/0142964 A1 | 6/2010 | Chang et al. |
| 2010/0272446 A1 | 10/2010 | Harley et al. |
| 2012/0014470 A1* | 1/2012 | Cho ........................ G02F 1/225 375/279 |
| 2012/0232819 A1* | 9/2012 | Yu ..................... H04B 10/25133 702/66 |
| 2012/0301153 A1 | 11/2012 | Takeguchi et al. |
| 2015/0050030 A1* | 2/2015 | Le Taillandier De Gabory ............ H04B 10/50595 398/183 |

FOREIGN PATENT DOCUMENTS

| EP | 0 444 688 A2 | 9/1991 |
| EP | 2 333 915 A1 | 6/2011 |
| WO | WO 2007/104022 A2 | 9/2007 |

* cited by examiner

*Primary Examiner* — David Payne
*Assistant Examiner* — Omar S Ismail

(57) ABSTRACT

The present invention discloses a QPSK signal conjugate relationship identification method and apparatus. The method includes: receiving a first binary sequence signal, using the first binary sequence signal to modulate an optical signal, and determining, within a first predetermined range, a first bias voltage in a QPSK modulator; receiving a second binary sequence signal, using the second binary sequence signal to modulate the optical signal, determining a second range within the first predetermined range according to the first bias voltage, and determining, within the second range, a second bias voltage in the QPSK modulator; and determining a conjugate relationship of the QPSK signal according to a value relationship between the first bias voltage and the second bias voltage. The present invention features low costs and a small component size.

16 Claims, 9 Drawing Sheets

US 9,438,352 B2

QPSK SIGNAL CONJUGATE RELATIONSHIP IDENTIFICATION METHOD AND APPARATUS, AND DISPERSION COMPENSATION METHOD AND SYSTEM

CROSS-REFERENCE TO RELATED APPLICATION

This application claims priority to Chinese Patent Application No. 201310416618.1, filed on Sep. 12, 2013, which is hereby incorporated by reference in its entirety.

TECHNICAL FIELD

The present invention relates to the optical communications field, and in particular, to a Quadrature Phase Shift Keying (QPSK) signal conjugate relationship identification method and apparatus, and a dispersion compensation method and system.

BACKGROUND

In the current optical communications field, an optical phase modulator represented by a QPSK modulator has become a mainstream product in the industry. After the QPSK modulator modulates an electrical signal to an optical signal, an output modulated optical signal (generally a QPSK signal) usually has two mutually conjugate possibilities, for example, I+jQ (or −I−jQ) and I−jQ (or −I+jQ), where I is an in-phase signal and Q is a quadrature signal.

A conventional QPSK signal conjugate relationship identification method, that is, a conventional method for identifying which of the two possibilities a QPSK signal belongs to, includes: performing a coherent detection of a QPSK signal by using an ICR (Integrated Coherent Receiver) and an LO (Local Oscillator), to obtain an optical signal that has undergone coherent optical interference, so as to convert phase information of the QPSK signal into optical intensity information; using a PD (Photo Diode) and a high-speed ADC (Analog-to-Digital Converter) to perform optical-to-electrical conversion and analog-to-digital conversion on the interfered optical signal, so that the interfered optical signal is converted into a digital signal; comparing the obtained digital signal with a pulse signal to be modulated, and using a PDA (Phase Detection Algorithm) to perform phase determining on the QPSK signal to obtain the phase of the QPSK signal, and to further learn a conjugate relationship of the QPSK signal.

The conventional algorithm (PDA) to perform phase determining is rather complex, and a requirement for an analog-to-digital conversion speed of the signal that has undergone the optical-to-electrical conversion is high in the prior art, which causes high implementation costs. In addition, the components (such as the ICR and the LO) used in the foregoing method are large in size, and therefore are unsuitable to be applied in an optical module in which layout space is limited.

SUMMARY

To resolve a problem of high implementation costs and a large component size in the prior art, embodiments of the present invention provide a QPSK signal conjugate relationship identification method and apparatus, and a dispersion compensation method and system. The technical solutions are as follows:

According to one aspect, an embodiment of the present invention provides a QPSK signal conjugate relationship identification method, where the method includes:

controlling a QPSK modulator to receive a first binary sequence signal, using the first binary sequence signal to modulate an optical signal to obtain a first signal, and determining, within a first predetermined range, a first bias voltage in the QPSK modulator, so that the first signal at the first bias voltage is a QPSK signal and a root mean square power of the first signal at the first bias voltage is the smallest;

controlling the QPSK modulator to receive a second binary sequence signal, using the second binary sequence signal to modulate the optical signal to obtain a second signal, determining a second range within the first predetermined range according to the first bias voltage, and determining, within the second range, a second bias voltage in the QPSK modulator, so that a root mean square power of the second signal at the second bias voltage is the smallest; and determining a conjugate relationship of the QPSK signal according to a value relationship between the first bias voltage and the second bias voltage.

Optionally, the first binary sequence signal is a pseudo random binary sequence signal, and the second binary sequence signal is formed by periodically inserting a high-frequency sequence into the first binary sequence signal.

In a first possible implementation manner, where the determining, within a first predetermined range, a first bias voltage in the QPSK modulator includes:

controlling a child Mach-Zehnder MZ modulator of the QPSK modulator to work at a null point;

injecting a first disturbance signal into a bias control end of a parent MZ modulator of the QPSK modulator;

performing optical-to-electrical conversion and filtering on the first signal to obtain a first electrical signal;

performing root mean square power detection on the first electrical signal to obtain a first feedback signal;

using a first reference signal to perform synchronous detection on the first feedback signal to obtain a first error signal, where the first reference signal is a signal that is the same as the first disturbance signal; and adjusting a bias voltage of the parent MZ modulator according to the first error signal, and when the first error signal is null, determining that the bias voltage of the parent MZ modulator is the first bias voltage; and the determining, within the second range, a second bias voltage in the QPSK modulator includes:

controlling the child MZ modulator to work at a null point;

injecting a second disturbance signal into the bias control end of the parent MZ modulator;

performing optical-to-electrical conversion and filtering on the second signal to obtain a second electrical signal;

performing root mean square power detection on the second electrical signal to obtain a second feedback signal;

using a second reference signal to perform synchronous detection on the second feedback signal to obtain a second error signal, where the second reference signal is a signal that is the same as the second disturbance signal; and adjusting the bias voltage of the parent MZ modulator according to the second error signal, and when the second error signal is null, determining that the bias voltage of the parent MZ modulator is the second bias voltage.

In a second possible implementation manner, where the determining, within a first predetermined range, a first bias voltage in the QPSK modulator includes:

controlling the child MZ modulator to work at a null point;

controlling the bias voltage of the parent MZ modulator to change at a set adjustment step and obtain multiple third bias voltages, where the third bias voltages fall within the first predetermined range;

performing optical-to-electrical conversion and filtering on the first signal at the multiple third bias voltages to obtain multiple first electrical signals;

performing root mean square power detection on the multiple first electrical signals to obtain root mean square powers of the multiple first signals;

selecting a third bias voltage of a first signal corresponding to the smallest root mean square power from the root mean square powers of the multiple first signals, and using the selected third bias voltage as the first bias voltage;

the determining, within the second range, a second bias voltage in the QPSK modulator includes:

controlling the child MZ modulator to work at a null point;

controlling the bias voltage of the parent MZ modulator to change at a set adjustment step and obtain multiple fourth bias voltages, where the fourth bias voltages fall within the second range;

performing optical-to-electrical conversion and filtering on the second signal at the multiple fourth bias voltages to obtain multiple second electrical signals;

performing root mean square power detection on the multiple second electrical signals to obtain root mean square powers of the multiple second signals; and selecting a fourth bias voltage of a second signal corresponding to the smallest root mean square power from the root mean square powers of the multiple second signals, and using the selected fourth bias voltage as the second bias voltage.

Specifically, the determining a conjugate relationship of the QPSK signal according to a value relationship between the first bias voltage and the second bias voltage includes:

comparing a value of the first bias voltage with a value of the second bias voltage;

if the first bias voltage is less than the second bias voltage, determining that the conjugate relationship of the QPSK signal is I−jQ; and if the first bias voltage is greater than the second bias voltage, determining that the conjugate relationship of the QPSK signal is I+jQ, where I is an in-phase signal and Q is a quadrature signal.

According to another aspect, an embodiment of the present invention provides a QPSK signal conjugate relationship identification apparatus, where the apparatus includes:

a QPSK modulator, configured to receive a first binary sequence signal and use the first binary sequence signal to modulate an optical signal to obtain a first signal; and receive a second binary sequence signal and use the second binary sequence signal to modulate the optical signal to obtain a second signal; and a processing module, configured to: when the QPSK modulator uses the first binary sequence signal to modulate the optical signal, determine, within a first predetermined range, a first bias voltage in the QPSK modulator, so that the first signal at the first bias voltage is a QPSK signal and a root mean square power of the first signal at the first bias voltage is the smallest, and determine a second range within the first predetermined range according to the first bias voltage; when the QPSK modulator uses the second binary sequence signal to modulate the optical signal, determine, within the second range, a second bias voltage in the QPSK modulator, so that a root mean square power of the second signal at the second bias voltage is the smallest; and determine a conjugate relationship of the QPSK signal according to a value relationship between the first bias voltage and the second bias voltage.

In a first possible implementation manner, the processing module includes:

a processor, configured to control a child Mach-Zehnder MZ modulator of the QPSK modulator to work at a null point, and control a bias voltage of a parent MZ modulator of the QPSK modulator to change at a set adjustment step and obtain multiple third bias voltages and multiple fourth bias voltages, where the third bias voltages fall within the first predetermined range and the fourth bias voltages fall within the second range;

an optical-to-electrical conversion component, configured to perform optical-to-electrical conversion on the first signal at the multiple third bias voltages to obtain multiple first electrical signals; and perform optical-to-electrical conversion on the second signal at the multiple fourth bias voltages to obtain multiple second electrical signals;

a root mean square power detector, configured to perform root mean square power detection on the multiple first electrical signals that are output by the optical-to-electrical conversion component, so as to obtain root mean square powers of the multiple first signals, and perform root mean square power detection on the multiple second electrical signals that are output by the optical-to-electrical conversion component, so as to obtain root mean square powers of the multiple second signals; and an analog-to-digital converter, configured to perform analog-to-digital conversion on the root mean square powers of the multiple first signals and the root mean square powers of the multiple second signals, where the processor is further configured to select a third bias voltage of a first signal corresponding to the smallest root mean square power from the root mean square powers of the multiple first signals, and use the selected third bias voltage as the first bias voltage; and select a fourth bias voltage of a second signal corresponding to the smallest root mean square power from the root mean square powers of the multiple second signals, and use the selected fourth bias voltage as the second bias voltage.

In a second possible implementation manner, the processing module includes:

a processor, configured to control a child Mach-Zehnder MZ modulator of the QPSK modulator to work at a null point, and control a bias voltage of a parent MZ modulator of the QPSK modulator to change at a set adjustment step and obtain multiple third bias voltages and multiple fourth bias voltages, where the third bias voltages fall within the first predetermined range and the fourth bias voltages fall within the second range;

an optical-to-electrical conversion component, configured to perform optical-to-electrical conversion on the first signal at the multiple third bias voltages to obtain multiple first electrical signals; and perform optical-to-electrical conversion on the second signal at the multiple fourth bias voltages to obtain multiple second electrical signals; and an analog-to-digital converter, configured to perform analog-to-digital conversion on the multiple first electrical signals and the multiple second electrical signals, where the processor is further configured to perform root mean square power detection on the multiple first electrical signals to obtain root mean square powers of the multiple first signals, where the multiple first electrical signals are output by the analog-to-digital converter after the analog-to-digital conversion, and select a third bias voltage of a first signal corresponding to the smallest root mean square power from the root mean square powers of the multiple first signals, and use the selected third bias voltage as the first bias voltage; and perform root mean square power detection on the multiple second electrical signals to obtain root mean square powers of the multiple second signals, where the multiple second electrical signals are output by the analog-to-digital converter after the analog-to-digital conversion, and select a fourth bias voltage of a second signal corresponding to the smallest root mean square power from the root mean square powers of the multiple second signals, and use the selected fourth bias voltage as the second bias voltage.

Optionally, the processing module further includes:

a signal amplification circuit, configured to amplify the multiple first electrical signals and the multiple second electrical signals that have undergone the optical-to-electrical conversion performed by the optical-to-electrical conversion component, and send the amplified multiple first electrical signals and the amplified multiple second electrical signals to the analog-to-digital converter.

Optionally, the apparatus further includes:

a signal generating module, configured to generate the first binary sequence signal and the second binary sequence signal.

According to another aspect, an embodiment of the present invention provides a dispersion compensation method, where the method includes:

identifying a conjugate relationship of a QPSK signal by using the foregoing quadrature phase shift keying QPSK signal conjugate relationship identification method; and performing, according to the conjugate relationship of the QPSK signal, optical dispersion pre-compensation coding on an electrical signal to be input into a QPSK modulator.

According to another aspect, an embodiment of the present invention provides a dispersion compensation system, where the system includes an identification apparatus and a compensation apparatus, where the identification apparatus is the foregoing quadrature phase shift keying QPSK signal conjugate relationship identification apparatus; and the compensation apparatus is configured to: according to a conjugate relationship of a QPSK signal, which is obtained by the identification apparatus, perform optical dispersion pre-compensation coding on an electrical signal to be input into a QPSK modulator.

The technical solutions provided in the embodiments of the present invention bring the following beneficial effects:

A QPSK modulator is controlled to modulate, by using a first binary sequence signal, an optical signal to determine a first bias voltage in the QPSK modulator; the QPSK modulator is controlled to modulate, by using a second binary sequence signal, the optical signal to determine a second bias voltage in the QPSK modulator; and a conjugate relationship of a QPSK signal is determined according to a value relationship between the first bias voltage and the second bias voltage. The first bias voltage and the second bias voltage are determined according to the smallest RMS power of an output signal of the QPSK modulator. Because an algorithm for obtaining the smallest root mean square power is relatively simple, a requirement for a signal conversion speed is relatively low, and mature commercial components are available and highly integrated, costs are low. In addition, the embodiments of the present invention may be implemented by using a small-sized component (a root mean square power detector) and is suitable for an optical module in which layout space is limited.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make objectives, technical solutions and merits of the present invention clearer, the following describes implementation manners of the present invention in more detail with reference to accompanying drawings.

For ease of understanding the embodiments of the present invention, the following briefly describes a structure and working principles of a QPSK modulator provided in the embodiments of the present invention.

Figure 1:
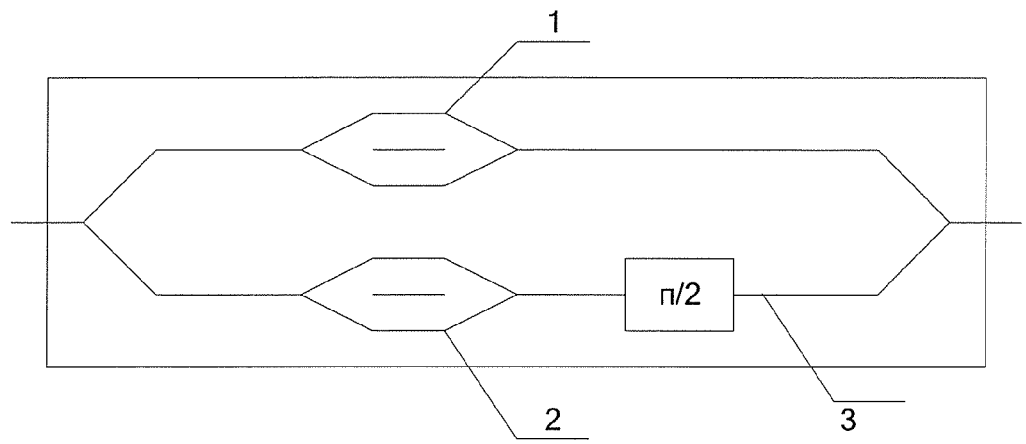
FIG. 1 is a schematic structural diagram of a QPSK modulator according to an embodiment of the present invention.

Referring to FIG. 1, a QPSK modulator includes three MZ (Mach-Zehnder, also known as Mach Zehnder) modulators, where the three MZ modulators are a first child MZ modulator 1, a second child MZ modulator 2, and a parent MZ modulator 3. For the MZ modulator, two bias points exist: one is a Null (null) point, and the other is a Quarter (quarter)

point. A different bias point forms a different phase mapping relationship between an optical signal and an electrical signal.

Both of the two bias points have a positive polarity and a negative polarity. In other words, the Null point may be categorized into a +Null point and a −Null point, and the Quarter point may be categorized into a +Quarter point and a −Quarter point. When the MZ modulator is biased at the +Null point, electrical signals 1 and 0 may be converted into optical phase signals 0 and n (or −n); when the MZ modulator is biased at the −Null point, the electrical signals 1 and 0 may be converted into optical phase signals n (or −n) and 0; when the MZ modulator is biased at the +Quarter point, a phase of an optical phase signal corresponding to the electrical signal may be increased by $\pi/2$; and when the MZ modulator is biased at the −Quarter point, the phase of the optical phase signal corresponding to the electrical signal may be decreased by $\pi/2$.

Figure 2:
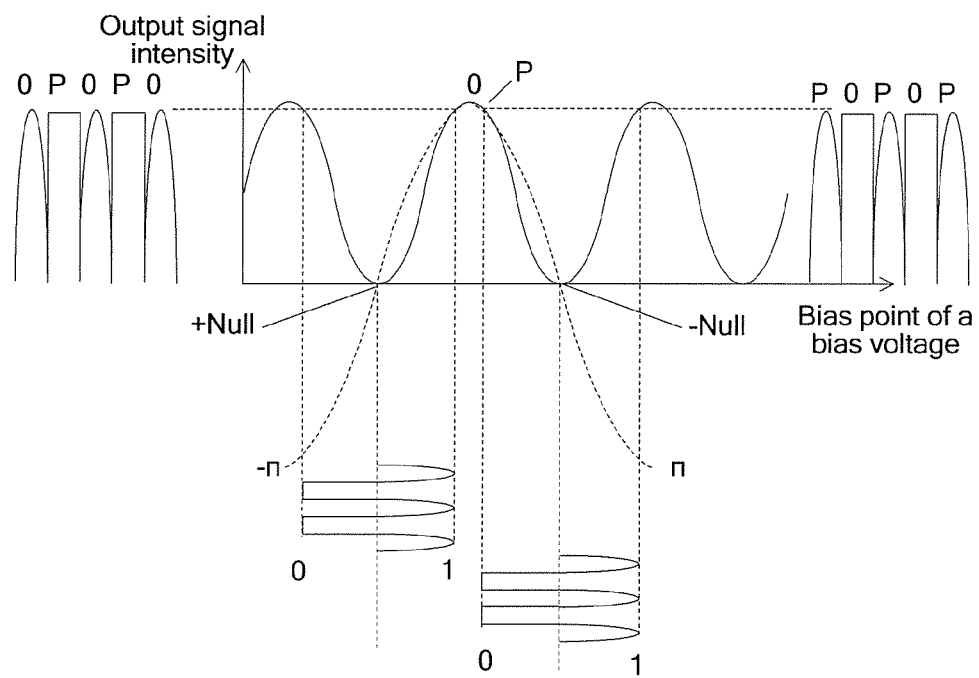
FIG. 2 is a diagram of a relationship between an output signal optical intensity of an MZ modulator and a bias point of a bias voltage of the MZ modulator according to an embodiment of the present invention.

When the QPSK modulator is started, each MZ modulator may select to work at any bias point that enables an output signal of the MZ modulator to satisfy a predetermined condition. For the first child MZ modulator or the second child MZ modulator, the predetermined condition is that an optical intensity of the signal output by the first child MZ modulator or the second child MZ modulator is a predetermined optical intensity; and for the parent MZ modulator, the predetermined condition is that a phase of a signal output by the parent MZ modulator is a predetermined phase. FIG. 2 is a diagram of a relationship between an output signal optical intensity of an MZ modulator and a bias point of a Bias (bias) voltage of the MZ modulator according to an embodiment of the present invention. In FIG. 2, the horizontal axis represents the bias point of the Bias voltage of the MZ modulator, the vertical axis represents the intensity of the output signal of the MZ modulator, a solid line represents a relationship between the intensity of the output signal of the MZ modulator and the bias point of the Bias voltage of the MZ modulator, and a dashed line represents a relationship between a phase of the output signal of the MZ modulator and the bias point of the Bias voltage of the MZ modulator. It can be learned from FIG. 2 that a predetermined intensity may correspond to a positive bias point and a negative bias point. For example, a bias point of the Bias voltage of the MZ modulator corresponding to a point of an intensity 0 may be a +Null point or a −Null point, and for another example, a bias point of the Bias voltage of the MZ modulator corresponding to a point of an intensity P may be positive or negative.

When the QPSK modulator performs QPSK code type modulation, the QPSK modulator divides a pulse electrical signal into two signals: an I (in-phase, in-phase) signal and a Q (quadrature) signal. The first child MZ modulator 1 modulates an I electrical signal into an I optical phase signal, and the second child MZ modulator 2 modulates a Q electrical signal into a Q optical phase signal. The parent MZ modulator 3 modulates the Q optical phase signal into a quadrature signal of the I optical phase signal, and combines the modulated I optical phase signal and the quadrature signal of the I optical phase signal into one optical phase signal, that is, a QPSK signal.

In the QPSK code type modulation process, both the first child MZ modulator 1 and the second child MZ modulator 2 are biased at the Null point (which may be the +Null point or the −Null point), and the parent MZ modulator 3 is biased at the Quarter point (which may be the +Quarter point or the −Quarter point). When the first child MZ modulator or the second child MZ modulator is biased at the +Null point, a phase polarity of an optical signal modulated by the first child MZ modulator or the second child MZ modulator is defined as positive; when the first child MZ modulator or the second child MZ modulator is biased at the −Null point, the phase polarity of the optical signal modulated by the first child MZ modulator or the second child MZ modulator is defined as negative; similarly, when the parent MZ modulator is biased at the +Quarter point, a phase polarity of an optical signal modulated by the parent MZ modulator is defined as positive; and when the parent MZ modulator is biased at the −Quarter point, the phase polarity of the optical signal modulated by the parent MZ modulator is defined as negative.

As mentioned above, because both the first child MZ modulator 1 and the second child MZ modulator 2 may be biased at the +Null point or the −Null point, and the parent MZ modulator 3 may be biased at the +Quarter point or the −Quarter point, a conjugate relationship of a final output signal of the QPSK modulator may be any one of eight combination relationships described in Table 1.

TABLE 1

| Phase polarity of the I signal | Phase polarity of the Q signal | Parent MZ | Output QPSK signal |
|---|---|---|---|
| +I | +Q | +π/2 | I + jQ |
| +I | −Q | +π/2 | I − jQ |
| +I | +Q | −π/2 | I − jQ |
| +I | −Q | −π/2 | I + jQ |
| −I | +Q | +π/2 | −I + jQ |
| −I | −Q | +π/2 | −I − jQ |
| −I | +Q | −π/2 | −I − jQ |
| −I | −Q | −π/2 | −I + jQ |

Where, the I+jQ and the I−jQ are mutually conjugate. The −I−jQ is a result of rotating the I+jQ by 180°, and is essentially still the I+jQ. The −I+jQ is a result of rotating the I−jQ by 180°, and is essentially still the I−jQ. Therefore, the QPSK signal has two possibilities in which the I+jQ and the I−jQ are mutually conjugate.

Embodiment 1

Figure 3:
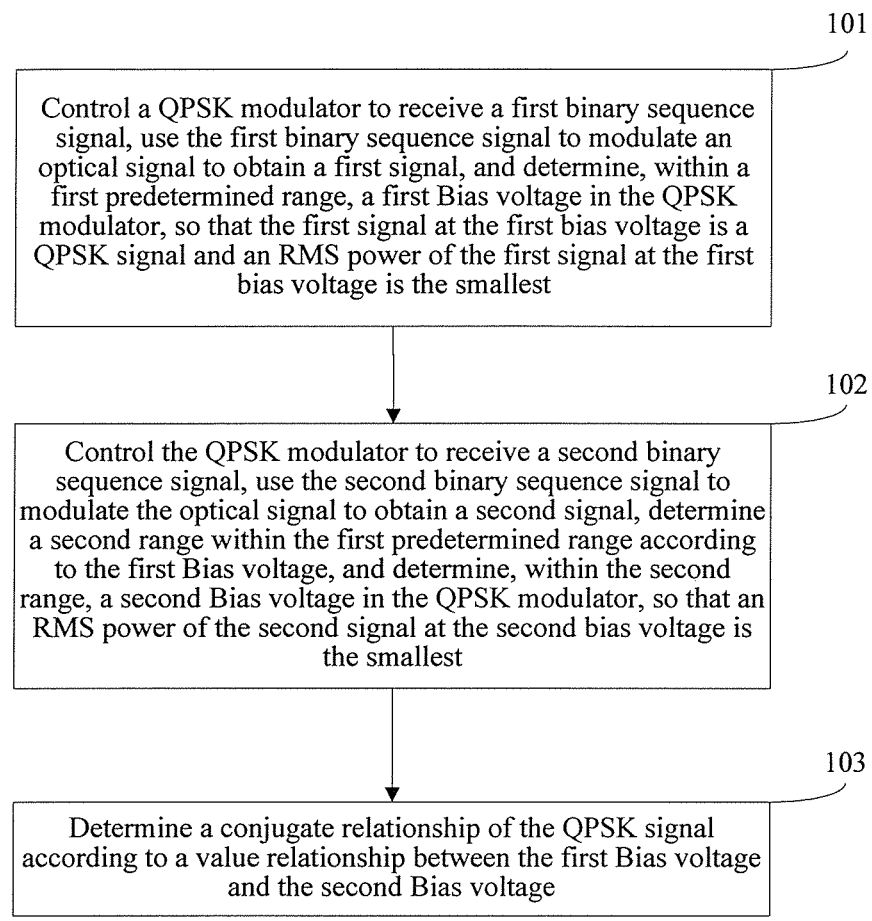
FIG. 3 is a flowchart of a QPSK signal conjugate relationship identification method according to Embodiment 1 of the present invention.

Embodiment 1 of the present invention provides a QPSK signal conjugate relationship identification method. Referring to FIG. 3, the method includes the following steps:

Step 101: Control a QPSK modulator to receive a first binary sequence signal, use the first binary sequence signal to modulate an optical signal to obtain a first signal, and determine, within a first predetermined range, a first Bias voltage in the QPSK modulator, so that the first signal at the first bias voltage is a QPSK signal and an RMS (Root Mean Square) power of the first signal at the first bias voltage is the smallest.

In this embodiment, the first predetermined range is a preset voltage range, and the first predetermined range may be an adjustable range of a Bias voltage of a parent MZ modulator.

Optionally, the first binary sequence signal is a PRBS (Pseudo Random Binary Sequence) signal.

Step 102: Control the QPSK modulator to receive a second binary sequence signal, use the second binary sequence signal to modulate the optical signal to obtain a second signal, determine a second range within the first predetermined range according to the first Bias voltage, and determine, within the second range, a second Bias voltage in the QPSK modulator, so that an RMS power of the second signal at the second bias voltage is the smallest.

In this embodiment, the second range is generally $V_1-0.5\%*V-V_1+0.5\%*V$, where $V_1$ is the first Bias voltage, and V is a half-wave voltage, where the half-wave voltage is a parameter of an MZ modulator.

Optionally, the second binary sequence signal is formed by periodically inserting a high-frequency sequence into the first binary sequence signal.

Step 103: Determine a conjugate relationship of the QPSK signal according to a value relationship between the first Bias voltage and the second Bias voltage.

In this embodiment of the present invention, a QPSK modulator is controlled to modulate, by using a first binary sequence signal, an optical signal to determine a first bias voltage in the QPSK modulator; the QPSK modulator is controlled to modulate, by using a second binary sequence signal, the optical signal to determine a second bias voltage in the QPSK modulator; and a conjugate relationship of a QPSK signal is determined according to a value relationship between the first bias voltage and the second bias voltage. The first bias voltage and the second bias voltage are determined according to the smallest RMS power of an output signal of the QPSK modulator. Because an algorithm for obtaining the smallest RMS power is relatively simple, a requirement for a signal conversion speed is relatively low, and mature commercial components are available and highly integrated, costs are low. In addition, this embodiment of the present invention may be implemented by using a small-sized component (an RMS power detector) and is suitable for an optical module in which layout space is limited.

Embodiment 2

Figure 4:
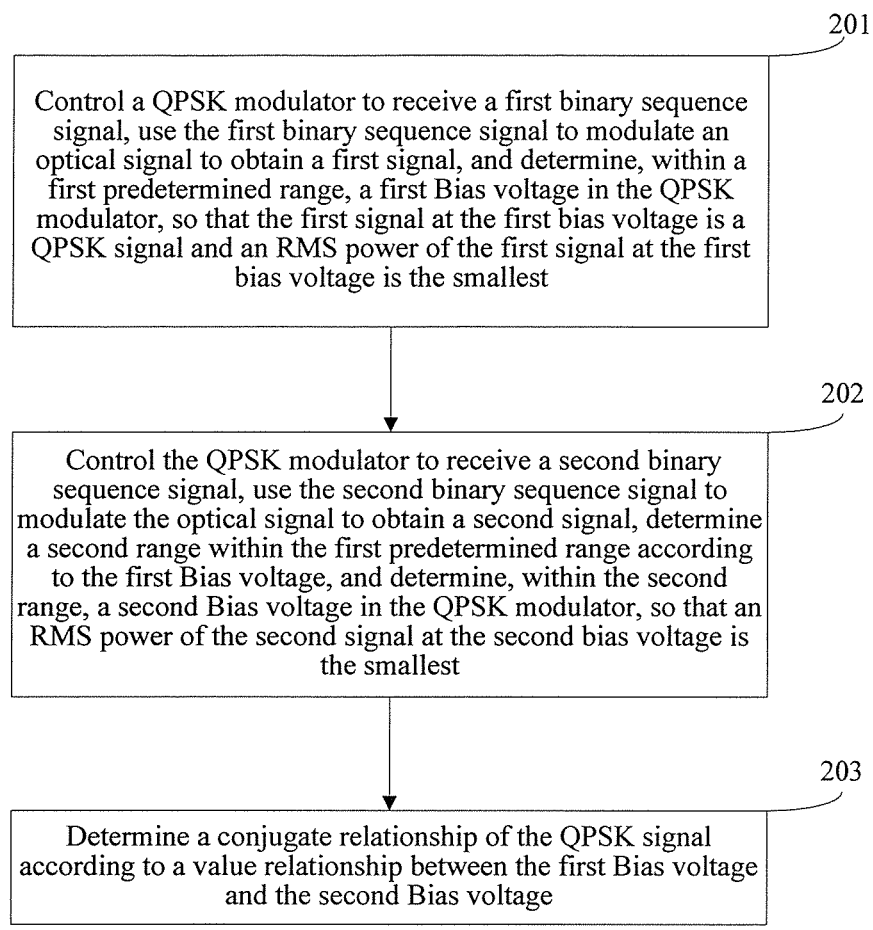
FIG. 4 is a flowchart of a QPSK signal conjugate relationship identification method according to Embodiment 2 of the present invention.

Embodiment 2 of the present invention provides a QPSK signal conjugate relationship identification method. Referring to FIG. 4, the method includes the following steps:

Step 201: Control a QPSK modulator to receive a first binary sequence signal, use the first binary sequence signal to modulate an optical signal to obtain a first signal, and determine, within a first predetermined range, a first Bias voltage in the QPSK modulator, so that the first signal at the first bias voltage is a QPSK signal and an RMS power of the first signal at the first bias voltage is the smallest.

In this embodiment, the first predetermined range is a preset voltage range, and the first predetermined range may be an adjustable range of a Bias voltage of a parent MZ modulator.

Optionally, the first binary sequence signal is a PRBS signal.

Figure 5:
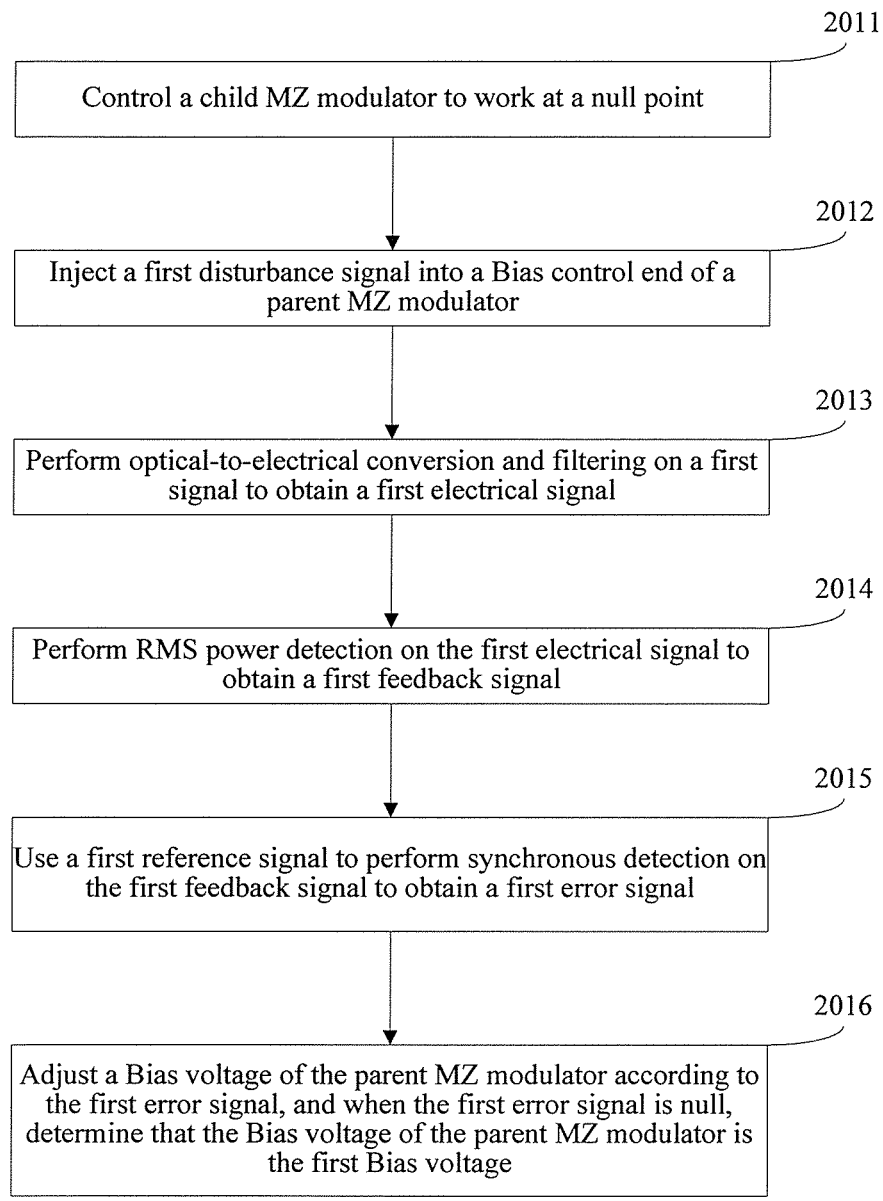
FIG. 5 is a flowchart of obtaining a first bias voltage according to Embodiment 2 of the present invention.

In an implementation manner of this embodiment, referring to FIG. 5, step 201 includes:

Step 2011: Control a child MZ modulator to work at a null point.

Step 2012: Inject a first disturbance signal into a Bias control end of the parent MZ modulator.

In this embodiment, the first disturbance signal may be a single-frequency signal.

Step 2013: Perform optical-to-electrical conversion and filtering on the first signal to obtain a first electrical signal.

Step 2014: Perform RMS power detection on the first electrical signal to obtain a first feedback signal.

Step 2015: Use a first reference signal to perform synchronous detection on the first feedback signal to obtain a first error signal.

In this embodiment, the first reference signal is a signal that is the same as the first disturbance signal.

Step 2016: Adjust a Bias voltage of the parent MZ modulator according to the first error signal, and when the first error signal is null, determine that the Bias voltage of the parent MZ modulator is the first Bias voltage.

Figure 6:
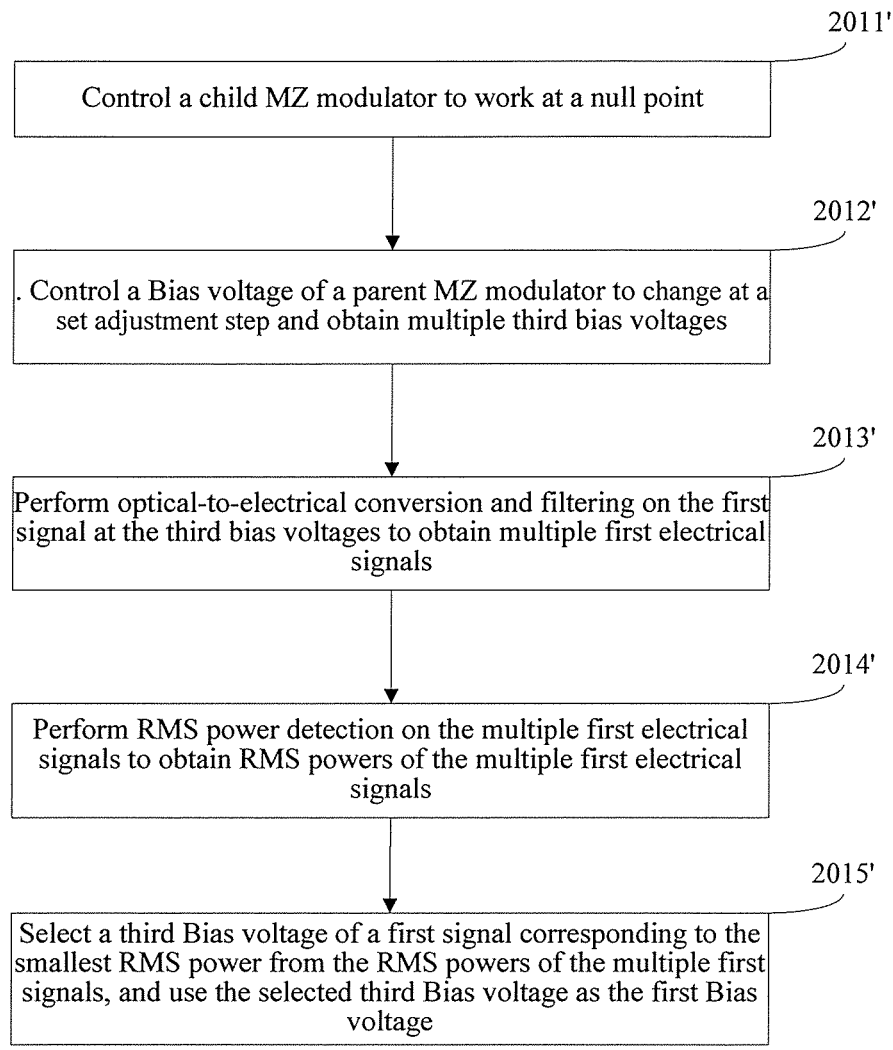
FIG. 6 is a flowchart of obtaining a first bias voltage according to Embodiment 2 of the present invention.

In another implementation manner of this embodiment, referring to FIG. 6, step 201 includes:

Step 2011': Control a child MZ modulator to work at a null point.

Step 2012': Control the Bias voltage of the parent MZ modulator to change at a set adjustment step and obtain multiple third bias voltages.

In this embodiment, the third bias voltages fall within the first predetermined range, and the set adjustment step may be 0.01V.

Step 2013': Perform optical-to-electrical conversion and filtering on the first signal at the multiple third bias voltages to obtain multiple first electrical signals.

Step 2014': Perform RMS power detection on the multiple first electrical signals to obtain RMS powers of the multiple first electrical signals.

Step 2015': Select a third Bias voltage of a first signal corresponding to the smallest RMS power from the RMS powers of the multiple first signals, and use the selected third Bias voltage as the first Bias voltage.

Step 202: Control the QPSK modulator to receive a second binary sequence signal, use the second binary sequence signal to modulate the optical signal to obtain a second signal, determine a second range within the first predetermined range according to the first Bias voltage, and determine, within the second range, a second Bias voltage in the QPSK modulator, so that an RMS power of the second signal at the second bias voltage is the smallest.

In this embodiment, the second range is generally $V_1-0.5\%*V-V_1+0.5\%*V$, where $V_1$ is the first Bias voltage, and V is a half-wave voltage, where the half-wave voltage is a parameter of an MZ modulator.

Optionally, the second binary sequence signal is formed by periodically inserting a high-frequency sequence into the first binary sequence signal. An insertion period may be set according to factors such as a physical bandwidth of a system. Specifically, the high-frequency sequence inserted each time may include n cyclic periods, and each cyclic period may be 10, where n may be set according to actual requirements, for example, set to 5 to 10.

Figure 7:
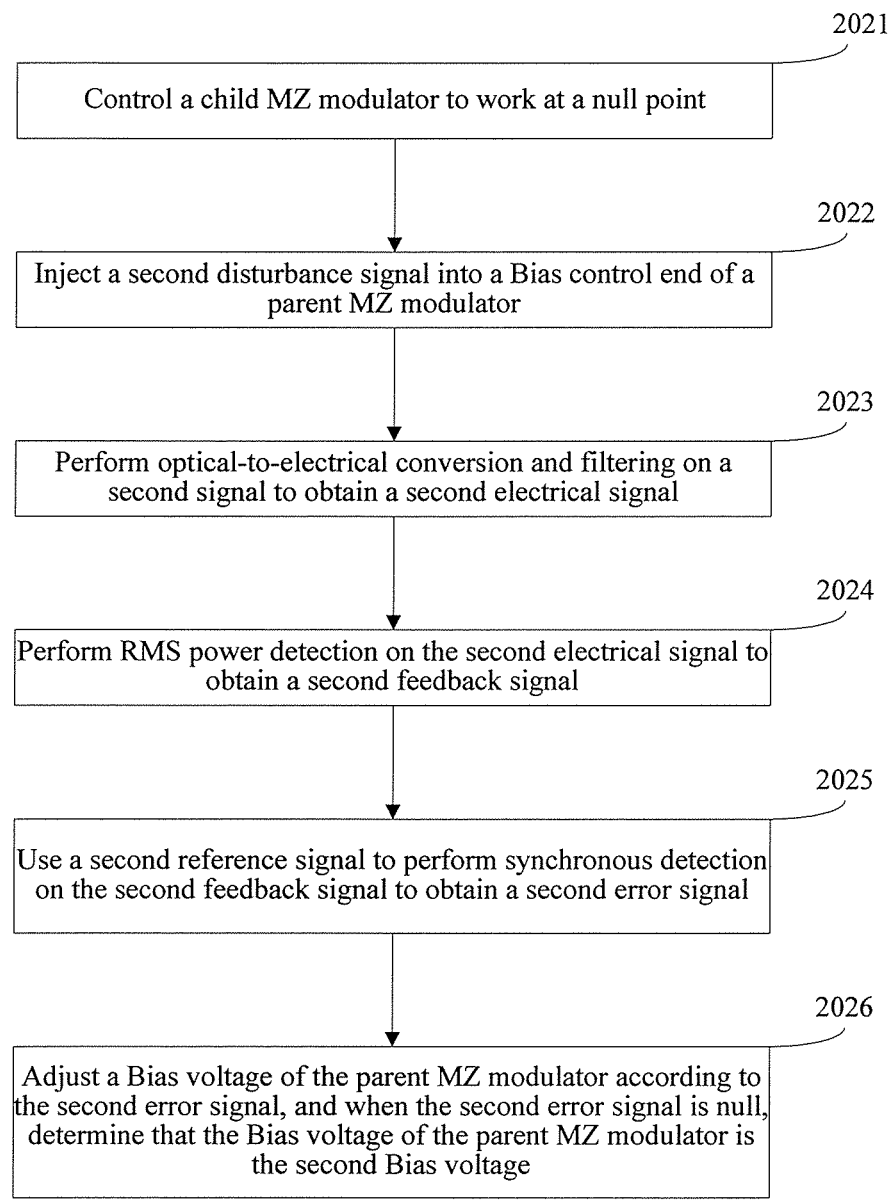
FIG. 7 is a flowchart of obtaining a second bias voltage according to Embodiment 2 of the present invention.

In an implementation manner of this embodiment, referring to FIG. 7, step 202 includes:

Step 2021: Control a child MZ modulator to work at a null point.

Step 2022: Inject a second disturbance signal into a Bias control end of the parent MZ modulator.

In this embodiment, the second disturbance signal may be a single-frequency signal.

Step 2023: Perform optical-to-electrical conversion and filtering on the second signal to obtain a second electrical signal.

Step 2024: Perform RMS power detection on the second electrical signal to obtain a second feedback signal.

Step 2025: Use a second reference signal to perform synchronous detection on the second feedback signal to obtain a second error signal.

In this embodiment, the second reference signal is a signal that is the same as the second disturbance signal.

Step 2026: Adjust a Bias voltage of the parent MZ modulator according to the second error signal, and when the second error signal is null, determine that the Bias voltage of the parent MZ modulator is the second Bias voltage.

Figure 8:
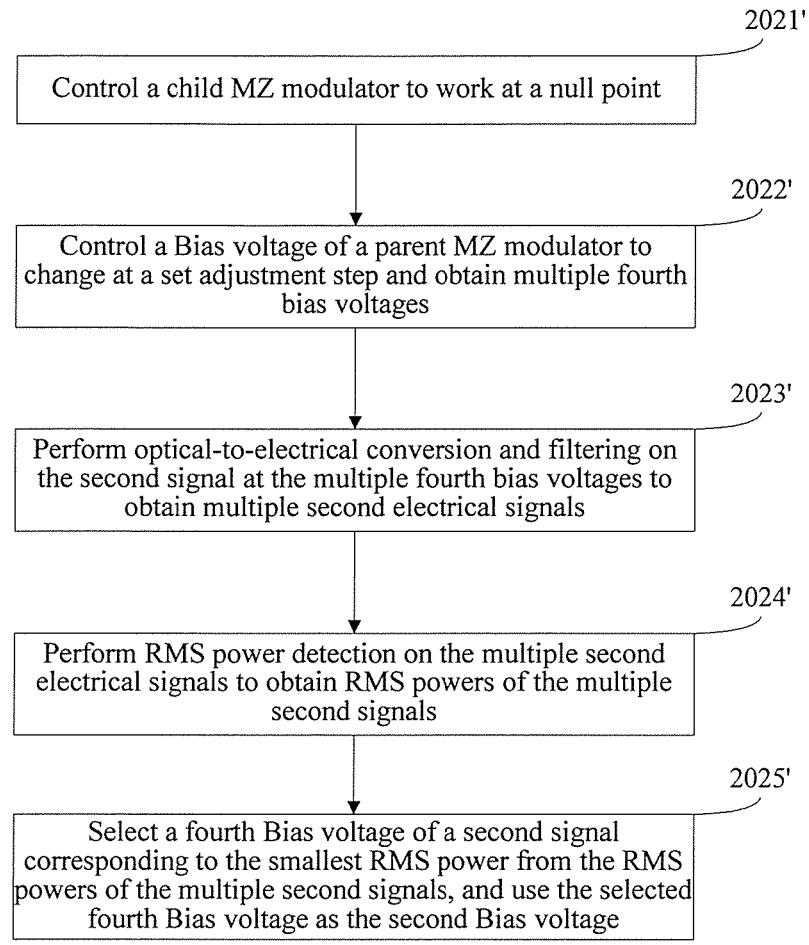
FIG. 8 is a flowchart of obtaining a second bias voltage according to Embodiment 2 of the present invention.

In another implementation manner of this embodiment, referring to FIG. 8, step 202 includes:

Step 2021': Control a child MZ modulator to work at a null point.

Step 2022': Control the Bias voltage of the parent MZ modulator to change at a set adjustment step and obtain multiple fourth bias voltages.

In this embodiment, the fourth bias voltages fall within the second range.

Step 2023': Perform optical-to-electrical conversion and filtering on the second signal at the multiple fourth bias voltages to obtain multiple second electrical signals.

Step 2024': Perform RMS power detection on the multiple second electrical signals to obtain RMS powers of the multiple second signals.

Step 2025': Select a fourth Bias voltage of a second signal corresponding to the smallest RMS power from the RMS powers of the multiple second signals, and use the selected fourth Bias voltage as the second Bias voltage.

Step 203: Determine a conjugate relationship of the QPSK signal according to a value relationship between the first Bias voltage and the second Bias voltage.

Specifically, step 203 may include: comparing a value of the first Bias voltage with a value of the second Bias voltage; if the first Bias voltage is less than the second Bias voltage, determining that the conjugate relationship of the QPSK signal is I–jQ; and if the first Bias voltage is greater than the second Bias voltage, determining that the conjugate relationship of the QPSK signal is I+jQ, where I is an in-phase signal and Q is a quadrature signal.

The following uses an experiment to prove correctness of the QPSK signal conjugate relationship identification method provided in this embodiment of the present invention.

Figure 9:
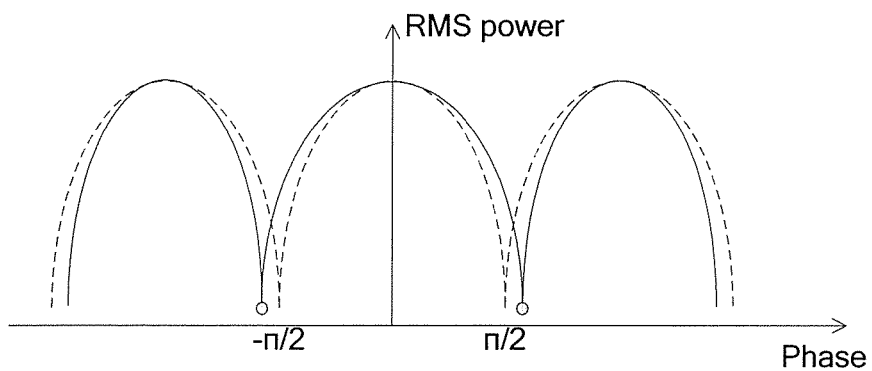
FIG. 9 is a diagram of a relationship between a root mean square power of an output signal of a QPSK modulator and a phase of the output signal of the QPSK modulator according to Embodiment 2 of the present invention.

First, a QPSK modulator is started, and an optical signal is modulated by using a first binary sequence signal, and a first child MZ modulator and a second child MZ modulator in the QPSK modulator are controlled to be biased at a Null point; a Bias voltage of a parent MZ modulator is adjusted, and an RMS power of a first signal output by the QPSK modulator and a phase of the first signal output by the QPSK modulator are measured to obtain a curve indicated by a dashed line in FIG. 9. The phase of the output signal of the QPSK modulator may be measured and determined by using the prior art (such as the method provided in BACKGROUND), and after the phase of the output signal of the QPSK modulator is obtained, a conjugate relationship of the QPSK signal in the output signal of the QPSK modulator is obtained.

Then, QPSK modulation is performed on the optical signal by using a second binary sequence signal. Similarly, the first child MZ modulator and the second child MZ modulator in the QPSK modulator are controlled to be biased at the Null point; the Bias voltage of the parent MZ modulator is adjusted, and the RMS power of a second signal output by the QPSK modulator and a phase of the second signal output by the QPSK modulator are measured to obtain a curve indicated by a solid line in FIG. 9.

It can be seen from FIG. 9 that when QPSK modulation is performed on the optical signal by using the first binary sequence signal, the first signal output by the QPSK modulator is a QPSK signal, and the first signal is exactly the smallest RMS power of the first signal output by the QPSK modulator.

When the conjugate relationship of the QPSK signal is I+jQ (that is, the right part in FIG. 9), the second binary sequence signal is used to modulate the optical signal instead, and the Bias voltage of the parent MZ modulator of the QPSK modulator is adjusted within a second range (the second range is determined according to the first Bias voltage, so as to ensure unchanged polarity of the bias point of the parent MZ modulator of the QPSK modulator), and the phase of the signal that is output by the QPSK modulator and has the smallest RMS power deviates rightward relative to the phase of the QPSK signal.

When the conjugate relationship of the QPSK signal is I–jQ (that is, the left part in FIG. 9), the second binary sequence signal is used to modulate the optical signal instead, and the Bias voltage of the parent MZ modulator of the QPSK modulator is adjusted within the second range, and the phase of the signal that is output by the QPSK modulator and has the smallest RMS power deviates leftward relative to the phase of the QPSK signal.

The phase of the output signal of the QPSK modulator may be controlled by the Bias voltage of the parent MZ modulator, that is, the phase of the output signal of the QPSK modulator is in a mapping relationship with the Bias voltage of the parent MZ modulator. Therefore, according to the mapping relationship, it can be obtained that, when the conjugate relationship of the QPSK signal is the I+jQ, the second Bias voltage corresponding to the smallest RMS power of the second signal output by the QPSK modulator is greater than the first Bias voltage corresponding to the smallest RMS power of the first signal output by the QPSK modulator. The first signal is a signal that is output by the QPSK modulator when the optical signal is modulated by using the first binary sequence signal, the second signal is a signal that is output by the QPSK modulator when the optical signal is modulated by using the second binary sequence signal, the second Bias voltage is obtained by the parent MZ modulator of the QPSK modulator by increasing or decreasing based on the first Bias voltage, and the polarity of the bias point of the parent MZ modulator of the QPSK modulator is unchanged.

When the conjugate relationship of the output signal of the QPSK modulator is the I–jQ, the second Bias voltage corresponding to the smallest RMS power of the second signal output by the QPSK modulator is less than the first Bias voltage corresponding to the smallest RMS power of the first signal output by the QPSK modulator.

Therefore, the method provided in this embodiment of the present invention can accurately identify the conjugate relationship of the output signal of the QPSK modulator.

In this embodiment of the present invention, a QPSK modulator is controlled to modulate, by using a first binary sequence signal, an optical signal to determine a first bias voltage in the QPSK modulator; the QPSK modulator is controlled to modulate, by using a second binary sequence signal, the optical signal to determine a second bias voltage in the QPSK modulator; and a conjugate relationship of a QPSK signal is determined according to a value relationship between the first bias voltage and the second bias voltage. The first bias voltage and the second bias voltage are determined according to the smallest RMS power of an output signal of the QPSK modulator. Because an algorithm for obtaining the smallest RMS power is relatively simple, a requirement for a signal conversion speed is relatively low, and mature commercial components are available and highly integrated, costs are low. In addition, this embodiment of the present invention may be implemented by using a small-sized component (an RMS power detector) and is suitable for an optical module in which layout space is limited.

Embodiment 3

Figure 10:
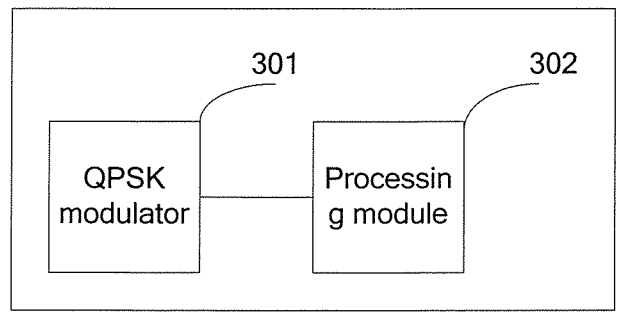
FIG. 10 is a schematic structural diagram of a QPSK signal conjugate relationship identification apparatus according to Embodiment 3 of the present invention.

Embodiment 3 of the present invention provides a QPSK signal conjugate relationship identification apparatus, which is applicable to the QPSK signal conjugate relationship identification method provided in Embodiment 1. Referring to FIG. 10, the apparatus includes:

a QPSK modulator 301, configured to receive a first binary sequence signal and use the first binary sequence signal to modulate an optical signal to obtain a first signal; and receive a second binary sequence signal and use the second binary sequence signal to modulate the optical signal to obtain a second signal; and a processing module 302, configured to: when the QPSK modulator 301 uses the first binary sequence signal to modulate the optical signal, determine, within a first predetermined range, a first Bias voltage in the QPSK modulator 301, so that the first signal at the first bias voltage is a QPSK signal and an RMS power of the first QPSK signal at the first bias voltage is the smallest, and determine a second range within the first predetermined range according to the first Bias voltage; when the QPSK modulator 301 uses the second binary sequence signal to modulate the optical signal, determine, within the second range, a second Bias voltage in the QPSK modulator 301, so that an RMS power of the second signal at the second bias voltage is the smallest; and determine a conjugate relationship of the QPSK signal according to a value relationship between the first Bias voltage and the second Bias voltage.

In this embodiment, the first predetermined range is a preset voltage range, and the first predetermined range may be an adjustable range of a Bias voltage of a parent MZ modulator. The second range is generally $V_1-0.5\%*V-V_1+0.5\%*V$, where $V_1$ is the first Bias voltage, and V is a half-wave voltage, where the half-wave voltage is a parameter of an MZ modulator.

Optionally, the first binary sequence signal is a PRBS signal, and the second binary sequence signal is formed by periodically inserting a high-frequency sequence into the first binary sequence signal.

In this embodiment of the present invention, a QPSK modulator is controlled to modulate, by using a first binary sequence signal, an optical signal to determine a first bias voltage in the QPSK modulator; the QPSK modulator is controlled to modulate, by using a second binary sequence signal, the optical signal to determine a second bias voltage in the QPSK modulator; and a conjugate relationship of a QPSK signal is determined according to a value relationship between the first bias voltage and the second bias voltage. The first bias voltage and the second bias voltage are determined according to the smallest RMS power of an output signal of the QPSK modulator. Because an algorithm for obtaining the smallest RMS power is relatively simple, a requirement for a signal conversion speed is relatively low, and mature commercial components are available and highly integrated, costs are low. In addition, this embodiment of the present invention may be implemented by using a small-sized component (an RMS power detector) and is suitable for an optical module in which layout space is limited.

Embodiment 4

Figure 11:
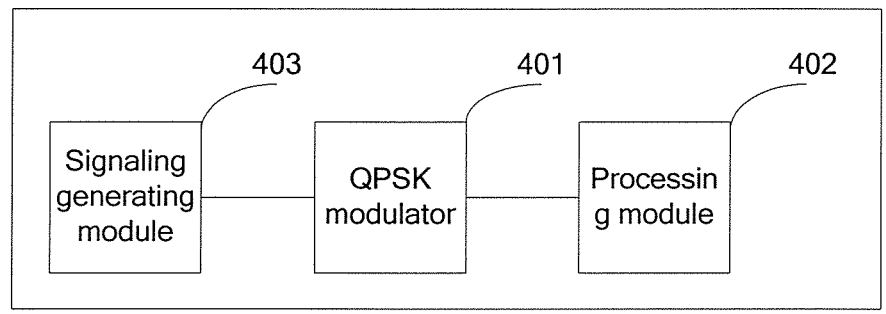
FIG. 11 is a schematic structural diagram of a QPSK signal conjugate relationship identification apparatus according to Embodiment 4 of the present invention.

Embodiment 4 of the present invention provides a QPSK signal conjugate relationship identification apparatus, which is applicable to the QPSK signal conjugate relationship identification method provided in Embodiment 2. Referring to FIG. 11, the apparatus includes:

a QPSK modulator 401, configured to receive a first binary sequence signal and use the first binary sequence signal to modulate an optical signal to obtain a first signal; and receive a second binary sequence signal and use the second binary sequence signal to modulate the optical signal to obtain a second signal; and a processing module 402, configured to: when the QPSK modulator 401 uses the first binary sequence signal to modulate the optical signal, determine, within a first predetermined range, a first Bias voltage in the QPSK modulator 401, so that the first signal at the first bias voltage is a QPSK signal and an RMS power of the first QPSK signal at the first bias voltage is the smallest, and determine a second range within the first predetermined range according to the first Bias voltage; when the QPSK modulator 401 uses the second binary sequence signal to modulate the optical signal, determine, within the second range, a second Bias voltage in the QPSK modulator 401, so that an RMS power of the second signal at the second bias voltage is the smallest; and determine a conjugate relationship of the QPSK signal according to a value relationship between the first Bias voltage and the second Bias voltage.

In this embodiment, the first predetermined range is a preset voltage range, and the first predetermined range may be an adjustable range of a Bias voltage of a parent MZ modulator. The second range is generally $V_1-0.5\%*V-V_1+0.5\%*V$, where $V_1$ is the first Bias voltage, and V is a half-wave voltage, where the half-wave voltage is a parameter of an MZ modulator.

Optionally, the first binary sequence signal is a PRBS signal, and the second binary sequence signal is formed by periodically inserting a high-frequency sequence into the first binary sequence signal.

Specifically, the QPSK modulator 401 may include:
a first child MZ modulator, configured to convert an in-phase signal into an optical phase signal;
a second child MZ modulator, configured to convert a quadrature signal into an optical phase signal; and
a parent MZ modulator, configured to adjust a phase of the modulated quadrature signal that is output by the second child MZ modulator, and combine the in-phase signal and the quadrature signal into one signal.

Specifically, the processing module 402 may be configured to compare a value of the first Bias voltage with a value of the second Bias voltage; if the first Bias voltage is less than the second Bias voltage, the conjugate relationship of the QPSK signal is I−jQ; and if the first Bias voltage is greater than the second Bias voltage, the conjugate relationship of the QPSK signal is I+jQ, where I is an in-phase signal and Q is a quadrature signal.

In an implementation manner of this embodiment, the processing module 402 may include:

a processor, configured to control a child MZ modulator (including the first child MZ modulator and the second child MZ modulator) to work at a null point, and control a bias voltage of a parent MZ modulator to change at a set adjustment step and obtain multiple third bias voltages and multiple fourth bias voltages, where the third bias voltages fall within the first predetermined range and the fourth bias voltages fall within the second range;

an optical-to-electrical conversion component, configured to perform optical-to-electrical conversion on the first signal at the multiple third bias voltages to obtain multiple first electrical signals; and perform optical-to-electrical conversion on the second signal at the fourth bias voltages to obtain multiple second electrical signals;

an RMS power detector, configured to perform RMS power detection on the multiple first electrical signals that are output by the optical-to-electrical conversion component, so as to obtain RMS powers of the multiple first signals, and perform RMS power detection on the multiple second electrical signals that are output by the optical-to-electrical conversion component, so as to obtain RMS powers of the multiple second signals; and an ADC, configured to perform analog-to-digital conversion on the RMS powers of the multiple first signals and the RMS powers of the multiple second signals.

The processor is further configured to select a third bias voltage of a first signal corresponding to the smallest RMS power from the RMS powers of the multiple first signals, and use the selected third Bias voltage as the first Bias voltage; and select a fourth Bias voltage of a second signal corresponding to the smallest RMS power from the RMS powers of the multiple second signals, and use the selected fourth Bias voltage as the second Bias voltage.

In this embodiment, the set adjustment step may be 0.01V.

Preferably, the optical-to-electrical conversion component may be a PD that is integrated in the QPSK modulator 401, so as to reduce costs of the apparatus.

Optionally, the optical-to-electrical conversion component may be an external PD.

Optionally, the ADC may be a low-speed ADC.

Optionally, the processor may be a CPU (Central Processing Unit).

In another implementation manner of this embodiment, the processor 402 may include:

a processor, configured to control a child MZ modulator to work at a null point, and control a bias voltage of a parent MZ modulator to change at a set adjustment step and obtain multiple third bias voltages and multiple fourth bias voltages, where the third bias voltages fall within the first predetermined range and the fourth bias voltages fall within the second range;

an optical-to-electrical conversion component, configured to perform optical-to-electrical conversion on the first signal at the multiple third bias voltages to obtain multiple first electrical signals; and perform optical-to-electrical conversion on the second signal at the fourth bias voltages to obtain multiple second electrical signals; and an ADC, configured to perform analog-to-digital conversion on the multiple first electrical signals and the multiple second electrical signals.

The processor is further configured to: perform RMS power detection on the multiple first electrical signals to obtain RMS powers of the multiple first signals, where the first electrical signals are output by the ADC after the analog-to-digital conversion, select a third Bias voltage of a first signal corresponding to the smallest RMS power from the RMS powers of the multiple first signals, and use the selected third Bias voltage as the first Bias voltage; and perform RMS power detection on the multiple second electrical signals to obtain RMS powers of the multiple second signals, where the second electrical signals are output by the ADC after the analog-to-digital conversion, select a fourth Bias voltage of a second signal corresponding to the smallest RMS power from the RMS powers of the multiple second signals, and use the selected fourth Bias voltage as the second Bias voltage.

Preferably, the optical-to-electrical conversion component may be a PD that is integrated in the QPSK modulator 401, so as to reduce costs of the apparatus.

Optionally, the optical-to-electrical conversion component may be an external PD.

Optionally, the ADC may be a high-speed ADC.

Optionally, the processor may be a CPU.

In still another implementation manner of this embodiment, the processor 402 may further include a signal amplification circuit, configured to amplify the multiple first electrical signals and the multiple second electrical signals that have undergone the optical-to-electrical conversion performed by the optical-to-electrical conversion component, and send the multiple amplified first electrical signals and the multiple amplified second electrical signals to the analog-to-digital converter.

In still another implementation manner of this embodiment, the apparatus further includes a signal generating module 403, configured to generate the first binary sequence signal and the second binary sequence signal.

Optionally, the signal generating module 403 may be a conventional signal generator or may be a combination of a MUX (Multiplexer, parallel-to-serial converter) and a DSP (Digital Signal Processing) chip that are integrated in an optical module, or may be a combination of the MUX and a board Framer (frame processing module) chip, or may be a combination of the DSP chip and the board Framer chip.

In this embodiment of the present invention, a QPSK modulator is controlled to modulate, by using a first binary sequence signal, an optical signal to determine a first bias voltage in the QPSK modulator; the QPSK modulator is controlled to modulate, by using a second binary sequence signal, the optical signal to determine a second bias voltage in the QPSK modulator; and a conjugate relationship of a QPSK signal is determined according to a value relationship between the first bias voltage and the second bias voltage. The first bias voltage and the second bias voltage are determined according to the smallest RMS power of an output signal of the QPSK modulator. Because an algorithm for obtaining the smallest RMS power is relatively simple, a requirement for a signal conversion speed is relatively low, and mature commercial components are available and highly integrated, costs are low. In addition, this embodiment of the present invention may be implemented by using a small-sized component (an RMS power detector) and is suitable for an optical module in which layout space is limited.

Embodiment 5

Figure 12:
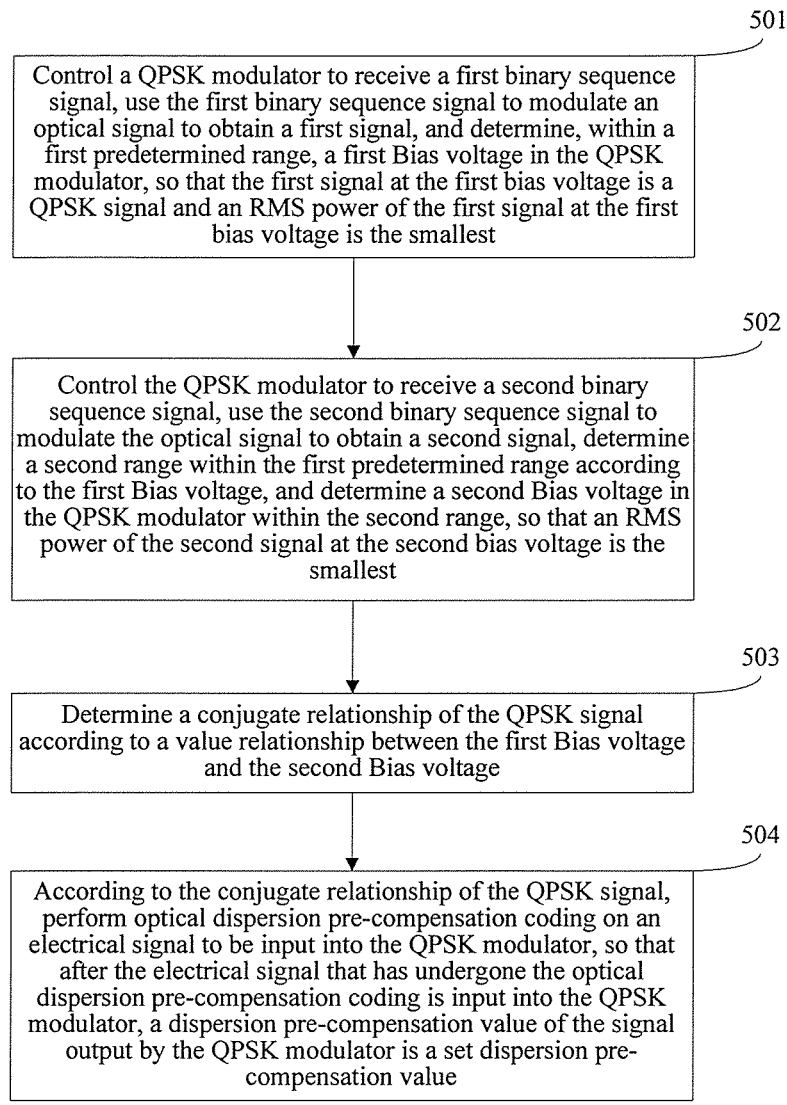
FIG. 12 is a flowchart of a dispersion compensation method according to Embodiment 5 of the present invention.

Embodiment 5 of the present invention provides a dispersion compensation method. Referring to FIG. 12, the method includes the following steps:

Step 501: Control a QPSK modulator to receive a first binary sequence signal, use the first binary sequence signal to modulate an optical signal to obtain a first signal, and determine, within a first predetermined range, a first Bias voltage in the QPSK modulator, so that the first signal at the first bias voltage is a QPSK signal and an RMS power of the first signal at the first bias voltage is the smallest.

In this embodiment, the first predetermined range is a preset voltage range, and the first predetermined range may be an adjustable range of a Bias voltage of a parent MZ modulator.

Optionally, the first binary sequence signal is a PRBS signal.

Step 502: Control the QPSK modulator to receive a second binary sequence signal, use the second binary sequence signal to modulate the optical signal to obtain a second signal, determine a second range within the first predetermined range according to the first Bias voltage, and determine, within the second range, a second Bias voltage in the QPSK modulator, so that an RMS power of the second signal at the second bias voltage is the smallest.

In this embodiment, the second range is generally $V_1-0.5\%*V - V_1+0.5\%*V$, where $V_1$ is the first Bias voltage, and V is a half-wave voltage, where the half-wave voltage is a parameter of an MZ modulator.

Optionally, the second binary sequence signal is formed by periodically inserting a high-frequency sequence into the first binary sequence signal.

Step 503: Determine a conjugate relationship of the QPSK signal according to a value relationship between the first Bias voltage and the second Bias voltage.

Specifically, steps 501-503 are the same as steps 101-103 in Embodiment 1 or steps 201-203 in Embodiment 2, and details are not described herein again.

Step 504: According to the conjugate relationship of the QPSK signal, perform optical dispersion pre-compensation coding on an electrical signal to be input into the QPSK modulator, so that after the electrical signal that has undergone the optical dispersion pre-compensation coding is input into the QPSK modulator, a dispersion pre-compensation value of the signal output by the QPSK modulator is a set dispersion pre-compensation value.

Specifically, the dispersion is defined as follows:

$$D = -\frac{\lambda}{c} * \frac{d^2 n}{d\lambda^2}$$

where D represents dispersion, $\lambda$ represents a wavelength, c represents light speed, and n represents a refractive index.

It can be learned from the foregoing formula that dispersion primarily reflects a change relationship between an optical waveguide refractive index and a signal wavelength (that is, frequency), and the refractive index is an indicator that reflects a transmission speed of light in the waveguide. Therefore, the dispersion actually reflects a transmission delay relationship of signals at different wavelengths (frequencies). In a frequency domain, a delay difference of signals at different frequencies is reflected by different additional phase changes at the time of receiving. Dispersion pre-compensation can suppress the additional phase changes.

In specific implementation, the dispersion pre-compensation coding changes a phase relationship of different frequency components in the electrical signal. After the electrical signal that has undergone the optical dispersion pre-compensation coding is input into the QPSK modulator for QPSK modulation, a QPSK signal for optical transmission may be obtained. The dispersion pre-compensation value of the QPSK signal for optical transmission is a set dispersion pre-compensation value.

Specifically, the optical dispersion pre-compensation coding for the electrical signal may be performed by using a function H(w), where H(w) is a conjugate of a link dispersion transmission function, $H(\omega)=\exp(-j\beta_2 * \omega^2 * L/2)$, and parameters $\beta$ and L are determined by the set dispersion compensation value. The set dispersion pre-compensation value corresponds to a phase change value caused by dispersion, and is determined according to a specific scenario such as conditions of a channel for optical transmission and an optical transmission distance. The method for determining the set dispersion pre-compensation value and the method for performing optical dispersion pre-compensation coding on the electrical signal are covered in the prior art, and detailed description is omitted here.

In a first specific implementation manner of step 504, step 504 may include:

determining a dispersion pre-compensation value (that is, the foregoing set dispersion pre-compensation value) according to an actual requirement;

performing, according to the dispersion pre-compensation value, optical dispersion pre-compensation coding on the electrical signal to be input into the QPSK modulator; and when the conjugate relationship of the QPSK signal is I–jQ, performing a negation operation on the I data or the Q data in the electrical signal that has undergone the optical dispersion pre-compensation coding, and then inputting the I data or the Q data into the QPSK modulator, so that the dispersion pre-compensation value of the modulated QPSK signal is the set dispersion pre-compensation value; and when the conjugate relationship of the QPSK signal is I+jQ, performing no processing on the electrical signal that has undergone the optical dispersion pre-compensation coding.

In a second specific implementation manner of step 504, step 504 may include:

determining a dispersion pre-compensation value according to an actual requirement;

performing, according to the dispersion pre-compensation value, optical dispersion pre-compensation coding on the electrical signal to be input into the QPSK modulator; and when the conjugate relationship of the QPSK signal is I–jQ, changing the conjugate relationship of the QPSK signal, and then inputting the electrical signal that has undergone the optical dispersion pre-compensation coding into the QPSK modulator; and when the conjugate relationship of the QPSK signal is I+jQ, directly inputting the electrical signal that has undergone the optical dispersion pre-compensation coding into the QPSK modulator.

Where, the changing the conjugate relationship of the QPSK signal includes:

modifying a bias point of any one MZ modulator of the QPSK modulator to an adjacent bias point.

In a third specific implementation manner of step 504, step 504 may include:

determining a dispersion pre-compensation value according to an actual requirement;

performing negation processing on the dispersion pre-compensation value according to the conjugate relationship of the QPSK signal; and performing, according to the negated dispersion pre-compensation value, optical dispersion pre-compensation coding on the electrical signal to be input into the QPSK modulator.

For example, assuming that the dispersion pre-compensation value determined according to the actual requirement is negative, that is, a negative dispersion pre-compensation value is required, but the conjugate relationship of the QPSK signal is I–jQ, then the negative dispersion pre-compensation value is changed to a positive dispersion pre-compensation value (that is, the negative dispersion pre-compensation value is negated to obtain the positive dispersion pre-compensation value), and optical dispersion pre-compensation coding is performed, according to the positive dispersion pre-compensation value, on the electrical signal to be input into the QPSK modulator, and a signal pre-compensated by using the negative dispersion pre-compensation value may be output after the signal is modulated by the QPSK modulator. If the conjugate relationship of the QPSK signal is I+jQ, the optical dispersion pre-compensation coding is performed, according to the negative dispersion pre-compensation value, on the electrical signal to be input into the QPSK modulator, where the modulated QPSK signal is the signal pre-compensated by using the negative dispersion pre-compensation value.

In this embodiment of the present invention, a QPSK modulator is controlled to modulate, by using a first binary sequence signal, an optical signal to determine a first bias voltage in the QPSK modulator; the QPSK modulator is controlled to modulate, by using a second binary sequence signal, the optical signal to determine a second bias voltage in the QPSK modulator; and a conjugate relationship of a QPSK signal is determined according to a value relationship between the first bias voltage and the second bias voltage. The first bias voltage and the second bias voltage are determined according to the smallest RMS power of an output signal of the QPSK modulator. Because an algorithm for obtaining the smallest RMS power is relatively simple, a requirement for a signal conversion speed is relatively low, and mature commercial components are available and highly integrated, costs are low. In addition, this embodiment of the present invention may be implemented by using a small-sized component (an RMS power detector) and is suitable for an optical module in which layout space is limited. In addition, in this embodiment of the present invention, optical dispersion pre-compensation is performed on the electrical signal according to the conjugate relationship of the QPSK signal, which can reduce impact of a non-linear cost on fiber transmission and improve transmission performance of an optical network.

Embodiment 6

Figure 13:
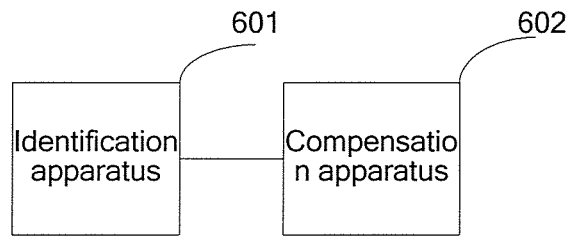
FIG. 13 is a schematic structural diagram of a dispersion compensation system according to Embodiment 6 of the present invention.

Embodiment 6 of the present invention provides a dispersion compensation system, which is applicable to the dispersion compensation method provided in Embodiment 5. Referring to FIG. 13, the system includes an identification apparatus 601 and a compensation apparatus 602, and the identification apparatus 601 is the QPSK signal conjugate relationship identification apparatus provided in Embodiment 3 or Embodiment 4.

The compensation apparatus 602 is configured to: according to a conjugate relationship of a QPSK signal, which is obtained by the identification apparatus 601, perform optical dispersion pre-compensation coding on an electrical signal to be input into a QPSK modulator.

Specifically, the dispersion is defined as follows:

$$D = -\frac{\lambda}{c} * \frac{d^2 n}{d\lambda^2}$$

where D represents dispersion, λ represents a wavelength, c represents light speed, and n represents a refractive index.

It can be learned from the foregoing formula that dispersion primarily reflects a change relationship between an optical waveguide refractive index and a signal wavelength (that is, frequency), and the refractive index is an indicator that reflects transmission speed of light in the waveguide. Therefore, the dispersion actually reflects a transmission delay relationship of signals at different wavelengths (frequencies). In a frequency domain, a delay difference of signals at different frequencies is reflected by different additional phase changes at the time of receiving. Dispersion pre-compensation can suppress the additional phase changes.

In specific implementation, the dispersion pre-compensation coding changes a phase relationship of different frequency components in the electrical signal. After the electrical signal that has undergone the optical dispersion pre-compensation coding is input into the QPSK modulator for QPSK modulation, a QPSK signal for optical transmission may be obtained. The dispersion pre-compensation value of the QPSK signal for optical transmission is a set dispersion pre-compensation value.

Specifically, the optical dispersion pre-compensation coding for the electrical signal may be performed by using a function H(w), where H(w) is a conjugate of a link dispersion transmission function, $H(\omega)=\exp(-j\beta_2*\omega^2*L/2)$, and parameters β and L are determined by the set dispersion compensation value. The set dispersion pre-compensation value corresponds to a phase change value caused by dispersion, and is determined according to a specific scenario such as conditions of a channel for optical transmission and optical transmission distance. The method for determining the set dispersion pre-compensation value and the method for performing optical dispersion pre-compensation coding on the electrical signal are covered in the prior art, and detailed description is omitted here.

In an implementation manner of this embodiment, the compensation apparatus 603 may be configured to:

determine a dispersion pre-compensation value (that is, the foregoing set dispersion pre-compensation value) according to an actual requirement;

perform, according to the dispersion pre-compensation value, optical dispersion pre-compensation coding on the electrical signal to be input into the QPSK modulator; and when the conjugate relationship of the QPSK signal is I–jQ, performing a negation operation on the I data or the Q data in the electrical signal that has undergone the optical dispersion pre-compensation coding, and then inputting the I data or the Q data into the QPSK modulator, so that the dispersion pre-compensation value of the modulated QPSK signal is the set dispersion pre-compensation value; and when the conjugate relationship of the QPSK signal is I+jQ, perform no processing on the electrical signal that has undergone the optical dispersion pre-compensation coding.

In another implementation manner of this embodiment, the compensation apparatus 603 may be configured to:

determine a dispersion pre-compensation value according to an actual requirement;

perform, according to the dispersion pre-compensation value, optical dispersion pre-compensation coding on the electrical signal to be input into the QPSK modulator; and when the conjugate relationship of the QPSK signal is I–jQ, change the conjugate relationship of the QPSK signal, and then input the electrical signal that has undergone the optical dispersion pre-compensation coding into the QPSK modulator; and when the conjugate relationship of the QPSK signal is I+jQ, directly input the electrical signal that has undergone the optical dispersion pre-compensation coding into the QPSK modulator.

Where, the changing the conjugate relationship of the QPSK signal includes:

modifying a bias point of any one MZ modulator of the QPSK modulator to an adjacent bias point.

In another implementation manner of the present invention, the compensation apparatus 603 may be configured to:

determine a dispersion pre-compensation value according to an actual requirement;

performing negation processing on the dispersion pre-compensation value according to the conjugate relationship of the QPSK signal; and perform, according to the negated dispersion pre-compensation value, optical dispersion pre-compensation coding on the electrical signal to be input into the QPSK modulator.

For example, assuming that the dispersion pre-compensation value determined according to the actual requirement is negative, that is, a negative dispersion pre-compensation value is required, but the conjugate relationship of the QPSK signal is I–jQ, then the negative dispersion pre-compensation value is changed to a positive dispersion pre-compensation value (that is, the negative dispersion pre-compensation value is negated to obtain the positive dispersion pre-compensation value), and optical dispersion pre-compensation coding is performed, according to the positive dispersion pre-compensation value, on the electrical signal to be input into the QPSK modulator, and a signal pre-compensated by using the negative dispersion pre-compensation value may be output after the signal is modulated by the QPSK modulator. If the conjugate relationship of the QPSK signal is I+jQ, the optical dispersion pre-compensation coding is performed, according to the negative dispersion pre-compensation value, on the electrical signal to be input into the QPSK modulator, where the modulated QPSK signal is the signal pre-compensated by using the negative dispersion pre-compensation value.

In this embodiment of the present invention, a QPSK modulator is controlled to modulate, by using a first binary sequence signal, an optical signal to determine a first bias voltage in the QPSK modulator; the QPSK modulator is controlled to modulate, by using a second binary sequence signal, the optical signal to determine a second bias voltage in the QPSK modulator; and a conjugate relationship of a QPSK signal is determined according to a value relationship between the first bias voltage and the second bias voltage. The first bias voltage and the second bias voltage are determined according to the smallest RMS power of an output signal of the QPSK modulator. Because an algorithm for obtaining the smallest RMS power is relatively simple, a requirement for a signal conversion speed is relatively low, and mature commercial components are available and highly integrated, costs are low. In addition, this embodiment of the present invention may be implemented by using a small-sized component (an RMS power detector) and is suitable for an optical module in which layout space is limited. In addition, in this embodiment of the present invention, optical dispersion pre-compensation is performed on the electrical signal according to the conjugate relationship of the QPSK signal, which can reduce impact of a non-linear cost on fiber transmission and improve transmission performance of an optical network.

It should be noted that, when the QPSK signal conjugate relationship identification apparatus provided in the embodiments identifies a conjugate relationship of a QPSK signal, the division of the function modules is used merely as an example; in an actual application, the functions may be allocated to different function modules to complete according to requirements, that is, an internal structure of the device is divided into different function modules for completing all or some functions described above. In addition, the QPSK signal conjugate relationship identification apparatus and the QPSK signal conjugate relationship identification method provided in the foregoing embodiments are based on the same conception. For a detailed implementation process, refer to the method embodiment, and no repeated description is given here any further.

The sequence numbers of the foregoing embodiments of the present invention are merely for description purpose but do not indicate the preference of the embodiments.

A person of ordinary skill in the art should understand that all or part of the steps of the embodiments may be implemented by hardware or by a program instructing relevant hardware. The program may be stored in a computer readable storage medium such as a read-only memory, a disk, an optical disc, or the like.

The foregoing descriptions are merely exemplary embodiments of the present invention, but are not intended to limit the present invention. Any modifications, equivalent substitutions, and improvements made within the spirit and the principle of the present invention shall fall within the protection scope of the present invention.

What is claimed is:

1. A quadrature phase shift keying (QPSK) signal conjugate relationship identification method, wherein the method comprises:
controlling a QPSK modulator to receive a first binary sequence signal, using the first binary sequence signal to modulate an optical signal to obtain a first signal, and determining, within a first predetermined range, a first bias voltage in the QPSK modulator, so that the first signal at the first bias voltage is a QPSK signal and a root mean square power of the first signal at the first bias voltage is the smallest;
controlling the QPSK modulator to receive a second binary sequence signal, using the second binary sequence signal to modulate the optical signal to obtain a second signal, determining a second range within the first predetermined range according to the first bias voltage, and determining, within the second range, a second bias voltage in the QPSK modulator, so that a root mean square power of the second signal at the second bias voltage is the smallest; and
determining a conjugate relationship of the QPSK signal according to a value relationship between the first bias voltage and the second bias voltage;
wherein determining the first bias voltage in the QPSK modulator comprises:
controlling a child Mach-Zehnder (MZ) modulator of the QPSK modulator to work at a null point;
injecting a first disturbance signal into a bias control end of a parent MZ modulator of the QPSK modulator;
performing optical-to-electrical conversion and filtering on the first signal to obtain a first electrical signal;
performing root mean square power detection on the first electrical signal to obtain a first feedback signal;
using a first reference signal to perform synchronous detection on the first feedback signal to obtain a first error signal, wherein the first reference signal is a signal that is the same as the first disturbance signal; and
adjusting a bias voltage of the parent MZ modulator according to the first error signal, and when the first error signal is null, determining that the bias voltage of the parent MZ modulator is the first bias voltage; and
determining the second bias voltage in the QPSK modulator comprises:
controlling the child MZ modulator to work at a null point;
injecting a second disturbance signal into the bias control end of the parent MZ modulator;
performing optical-to-electrical conversion and filtering on the second signal to obtain a second electrical signal;
performing root mean square power detection on the second electrical signal to obtain a second feedback signal;
using a second reference signal to perform synchronous detection on the second feedback signal to obtain a second error signal, wherein the second reference signal is a signal that is the same as the second disturbance signal; and
adjusting the bias voltage of the parent MZ modulator according to the second error signal, and when the second error signal is null, determining that the bias voltage of the parent MZ modulator is the second bias voltage.

2. The method according to claim 1, wherein the first binary sequence signal is a pseudo random binary sequence (PRBS) signal, and the second binary sequence signal is formed by inserting a periodic and high-frequency binary sequence into the first binary sequence signal.

3. The method according to claim 1, wherein determining the conjugate relationship comprises:
comparing a value of the first bias voltage with a value of the second bias voltage;
if the first bias voltage is less than the second bias voltage, determining that the conjugate relationship of the QPSK signal is I−jQ; and
if the first bias voltage is greater than the second bias voltage, determining that the conjugate relationship of the QPSK signal is I+jQ, wherein I is an in-phase signal and Q is a quadrature signal.

4. A quadrature phase shift keying (QPSK) signal conjugate relationship identification apparatus, wherein the apparatus comprises:
a QPSK modulator, configured to receive a first binary sequence signal and use the first binary sequence signal to modulate an optical signal to obtain a first signal; and receive a second binary sequence signal and use the second binary sequence signal to modulate the optical signal to obtain a second signal; and
a processing module, configured to: when the QPSK modulator uses the first binary sequence signal to modulate the optical signal, determine, within a first predetermined range, a first bias voltage in the QPSK modulator, so that the first signal at the first bias voltage is a QPSK signal and a root mean square power of the first signal at the first bias voltage is the smallest, and determine a second range within the first predetermined range according to the first bias voltage; when the QPSK modulator uses the second binary sequence signal to modulate the optical signal, determine, within the second range, a second bias voltage in the QPSK modulator, so that a root mean square power of the second signal at the second bias voltage is the smallest; and determine a conjugate relationship of the QPSK signal according to a value relationship between the first bias voltage and the second bias voltage;
wherein the processing module comprises:
a processor, configured to control a child Mach-Zehnder (MZ) modulator of the QPSK modulator to work at a null point, and control a bias voltage of a parent MZ modulator of the QPSK modulator to change at a set adjustment step and obtain multiple third bias voltages and multiple fourth bias voltages, wherein the third bias voltages fall within the first predetermined range and the fourth bias voltages fall within the second range;
an optical-to-electrical conversion component, configured to perform optical-to-electrical conversion on the first signal at the multiple third bias voltages to obtain multiple first electrical signals; and perform optical-to-electrical conversion on the second signal at the multiple fourth bias voltages to obtain multiple second electrical signals;
a root mean square power detector, configured to perform root mean square power detection on the multiple first electrical signals that are output by the optical-to-electrical conversion component, so as to obtain root mean square powers of the multiple first signals, and perform root mean square power detection on the multiple second electrical signals that are output by the optical-to-electrical conversion component, so as to obtain root mean square powers of the multiple second signals; and
an analog-to-digital converter, configured to perform analog-to-digital conversion on the root mean square powers of the multiple first signals and the root mean square powers of the multiple second signals, wherein
the processor is further configured to select a third bias voltage of a first signal corresponding to the smallest root mean square power from the root mean square powers of the multiple first signals, and use the selected third bias voltage as the first bias voltage; and select a fourth bias voltage of a second signal corresponding to the smallest root mean square power from the root mean square powers of the multiple second signals, and use the selected fourth bias voltage as the second bias voltage.

5. The apparatus according to claim 4, wherein the processing module further comprises:
a signal amplification circuit, configured to amplify the multiple first electrical signals and the multiple second electrical signals that have undergone the optical-to-electrical conversion performed by the optical-to-electrical conversion component, and send the amplified multiple first electrical signals and the amplified multiple second electrical signals to the analog-to-digital converter.

6. The apparatus according to claim 4, wherein the apparatus further comprises:
a signal generating module, configured to generate the first binary sequence signal and the second binary sequence signal.

7. A dispersion compensation system, wherein the system comprises an identification apparatus and a compensation apparatus, wherein the identification apparatus comprises:
a QPSK modulator, configured to receive a first binary sequence signal and use the first binary sequence signal to modulate an optical signal to obtain a first signal; and receive a second binary sequence signal and use the second binary sequence signal to modulate the optical signal to obtain a second signal; and
a processing module, configured to: when the QPSK modulator uses the first binary sequence signal to modulate the optical signal, determine, within a first predetermined range, a first bias voltage in the QPSK modulator, so that the first signal at the first bias voltage is a QPSK signal and a root mean square power of the first signal at the first bias voltage is the smallest, and determine a second range within the first predetermined range according to the first bias voltage; when the QPSK modulator uses the second binary sequence signal to modulate the optical signal, determine, within the second range, a second bias voltage in the QPSK modulator, so that a root mean square power of the second signal at the second bias voltage is the smallest; and determine a conjugate relationship of the QPSK signal according to a value relationship between the first bias voltage and the second bias voltage; and
the compensation apparatus is configured to: according to a conjugate relationship of a QPSK signal, which is obtained by the identification apparatus, perform optical dispersion pre-compensation coding on an electrical signal to be input into a QPSK modulator;
wherein the processing module comprises:
a processor, configured to control a child Mach-Zehnder (MZ) modulator of the QPSK modulator to work at a null point, and control a bias voltage of a parent MZ modulator of the QPSK modulator to change at a set adjustment step and obtain multiple third bias voltages and multiple fourth bias voltages, wherein the third bias voltages fall within the first predetermined range and the fourth bias voltages fall within the second range;

an optical-to-electrical conversion component, configured to perform optical-to-electrical conversion on the first signal at the multiple third bias voltages to obtain multiple first electrical signals; and perform optical-to-electrical conversion on the second signal at the multiple fourth bias voltages to obtain multiple second electrical signals;

a root mean square power detector, configured to perform root mean square power detection on the multiple first electrical signals that are output by the optical-to-electrical conversion component, so as to obtain root mean square powers of the multiple first signals, and perform root mean square power detection on the multiple second electrical signals that are output by the optical-to-electrical conversion component, so as to obtain root mean square powers of the multiple second signals; and an analog-to-digital converter, configured to perform analog-to-digital conversion on the root mean square powers of the multiple first signals and the root mean square powers of the multiple second signals, wherein the processor is further configured to select a third bias voltage of a first signal corresponding to the smallest root mean square power from the root mean square powers of the multiple first signals, and use the selected third bias voltage as the first bias voltage; and select a fourth bias voltage of a second signal corresponding to the smallest root mean square power from the root mean square powers of the multiple second signals, and use the selected fourth bias voltage as the second bias voltage.

8. The system according to claim 7, wherein the processing module further comprises:

a signal amplification circuit, configured to amplify the multiple first electrical signals and the multiple second electrical signals that have undergone the optical-to-electrical conversion performed by the optical-to-electrical conversion component, and send the amplified multiple first electrical signals and the amplified multiple second electrical signals to the analog-to-digital converter.

9. The system according to claim 7, wherein the apparatus further comprises:

a signal generating module, configured to generate the first binary sequence signal and the second binary sequence signal.

10. A quadrature phase shift keying (QPSK) signal conjugate relationship identification method, wherein the method comprises:

controlling a QPSK modulator to receive a first binary sequence signal, using the first binary sequence signal to modulate an optical signal to obtain a first signal, and determining, within a first predetermined range, a first bias voltage in the QPSK modulator, so that the first signal at the first bias voltage is a QPSK signal and a root mean square power of the first signal at the first bias voltage is the smallest;

controlling the QPSK modulator to receive a second binary sequence signal, using the second binary sequence signal to modulate the optical signal to obtain a second signal, determining a second range within the first predetermined range according to the first bias voltage, and determining, within the second range, a second bias voltage in the QPSK modulator, so that a root mean square power of the second signal at the second bias voltage is the smallest; and determining a conjugate relationship of the QPSK signal according to a value relationship between the first bias voltage and the second bias voltage;

wherein determining the first bias voltage in the QPSK modulator comprises:

controlling a child MZ modulator to work at a null point;

controlling a bias voltage of a parent MZ modulator to change at a set adjustment step and obtain multiple third bias voltages, wherein the third bias voltages fall within the first predetermined range;

performing optical-to-electrical conversion and filtering on the first signal at the multiple third bias voltages to obtain multiple first electrical signals;

performing root mean square power detection on the multiple first electrical signals to obtain root mean square powers of the multiple first signals;

selecting a third bias voltage of a first signal corresponding to the smallest root mean square power from the root mean square powers of the multiple first signals, and using the selected third bias voltage as the first bias voltage;

wherein determining the second bias voltage in the QPSK modulator comprises:

controlling the child MZ modulator to work at a null point;

controlling the bias voltage of the parent MZ modulator to change at a set adjustment step and obtain multiple fourth bias voltages, wherein the fourth bias voltages fall within the second range;

performing optical-to-electrical conversion and filtering on the second signal at the multiple fourth bias voltages to obtain multiple second electrical signals;

performing root mean square power detection on the multiple second electrical signals to obtain root mean square powers of the multiple second signals; and selecting a fourth bias voltage of a second signal corresponding to the smallest root mean square power from the root mean square powers of the multiple second signals, and using the selected fourth bias voltage as the second bias voltage.

11. The method according to claim 10, wherein the first binary sequence signal is a pseudo random binary sequence (PRBS) signal, and the second binary sequence signal is formed by inserting a periodic and high-frequency binary sequence into the first binary sequence signal.

12. The method according to claim 10, wherein determining the conjugate relationship comprises:

comparing a value of the first bias voltage with a value of the second bias voltage;

if the first bias voltage is less than the second bias voltage, determining that the conjugate relationship of the QPSK signal is I−jQ; and if the first bias voltage is greater than the second bias voltage, determining that the conjugate relationship of the QPSK signal is I+jQ, wherein I is an in-phase signal and Q is a quadrature signal.

13. A quadrature phase shift keying (QPSK) signal conjugate relationship identification apparatus, wherein the apparatus comprises:

a QPSK modulator, configured to receive a first binary sequence signal and use the first binary sequence signal to modulate an optical signal to obtain a first signal; and receive a second binary sequence signal and use the second binary sequence signal to modulate the optical signal to obtain a second signal; and a processing module, configured to: when the QPSK modulator uses the first binary sequence signal to modulate the optical signal, determine, within a first predetermined range, a first bias voltage in the QPSK modulator, so that the first signal at the first bias voltage is a QPSK signal and a root mean square power of the first signal at the first bias voltage is the smallest, and determine a second range within the first predetermined range according to the first bias voltage; when the QPSK modulator uses the second binary sequence signal to modulate the optical signal, determine, within the second range, a second bias voltage in the QPSK modulator, so that a root mean square power of the second signal at the second bias voltage is the smallest; and determine a conjugate relationship of the QPSK signal according to a value relationship between the first bias voltage and the second bias voltage;

wherein the processing module comprises:

a processor, configured to control a child Mach-Zehnder (MZ) modulator of the QPSK modulator to work at a null point, and control a bias voltage of a parent MZ modulator of the QPSK modulator to change at a set adjustment step and obtain multiple third bias voltages and multiple fourth bias voltages, wherein the third bias voltages fall within the first predetermined range and the fourth bias voltages fall within the second range;

an optical-to-electrical conversion component, configured to perform optical-to-electrical conversion on the first signal at the multiple third bias voltages to obtain multiple first electrical signals; and perform optical-to-electrical conversion on the second signal at the multiple fourth bias voltages to obtain multiple second electrical signals; and an analog-to-digital converter, configured to perform analog-to-digital conversion on the multiple first electrical signals and the multiple second electrical signals, wherein the processor is further configured to perform root mean square power detection on the multiple first electrical signals to obtain root mean square powers of the multiple first signals, wherein the multiple first electrical signals are output by the analog-to-digital converter after the analog-to-digital conversion, and select a third bias voltage of a first signal corresponding to the smallest root mean square power from the root mean square powers of the multiple first signals, and use the selected third bias voltage as the first bias voltage; and perform root mean square power detection on the multiple second electrical signals to obtain root mean square powers of the multiple second signals, wherein the multiple second electrical signals are output by the analog-to-digital converter after the analog-to-digital conversion, and select a fourth bias voltage of a second signal corresponding to the smallest root mean square power from the root mean square powers of the multiple second signals, and use the selected fourth bias voltage as the second bias voltage.

14. The apparatus according to claim 13, wherein the processing module further comprises:

a signal amplification circuit, configured to amplify the multiple first electrical signals and the multiple second electrical signals that have undergone the optical-to-electrical conversion performed by the optical-to-electrical conversion component, and send the amplified multiple first electrical signals and the amplified multiple second electrical signals to the analog-to-digital converter.

15. A dispersion compensation system, wherein the system comprises an identification apparatus and a compensation apparatus, wherein the identification apparatus comprises:

a QPSK modulator, configured to receive a first binary sequence signal and use the first binary sequence signal to modulate an optical signal to obtain a first signal; and receive a second binary sequence signal and use the second binary sequence signal to modulate the optical signal to obtain a second signal; and a processing module, configured to: when the QPSK modulator uses the first binary sequence signal to modulate the optical signal, determine, within a first predetermined range, a first bias voltage in the QPSK modulator, so that the first signal at the first bias voltage is a QPSK signal and a root mean square power of the first signal at the first bias voltage is the smallest, and determine a second range within the first predetermined range according to the first bias voltage; when the QPSK modulator uses the second binary sequence signal to modulate the optical signal, determine, within the second range, a second bias voltage in the QPSK modulator, so that a root mean square power of the second signal at the second bias voltage is the smallest; and determine a conjugate relationship of the QPSK signal according to a value relationship between the first bias voltage and the second bias voltage; and the compensation apparatus is configured to: according to a conjugate relationship of a QPSK signal, which is obtained by the identification apparatus, perform optical dispersion pre-compensation coding on an electrical signal to be input into a QPSK modulator;

wherein the processing module comprises:

a processor, configured to control a child MZ modulator of the QPSK modulator to work at a null point, and control a bias voltage of a parent MZ modulator of the QPSK modulator to change at a set adjustment step and obtain multiple third bias voltages and multiple fourth bias voltages, wherein the third bias voltages fall within the first predetermined range and the fourth bias voltages fall within the second range;

an optical-to-electrical conversion component, configured to perform optical-to-electrical conversion on the first signal at the multiple third bias voltages to obtain multiple first electrical signals; and perform optical-to-electrical conversion on the second signal at the multiple fourth bias voltages to obtain multiple second electrical signals; and an analog-to-digital converter, configured to perform analog-to-digital conversion on the multiple first electrical signals and the multiple second electrical signals, wherein the processor is further configured to perform root mean square power detection on the multiple first electrical signals to obtain root mean square powers of the multiple first signals, wherein the multiple first electrical signals are output by the analog-to-digital converter after the analog-to-digital conversion, and select a third bias voltage of a first signal corresponding to the smallest root mean square power from the root mean square powers of the multiple first signals, and use the selected third bias voltage as the first bias voltage; and perform root mean square power detection on the multiple second electrical signals to obtain root mean square powers of the multiple second signals, wherein the multiple second electrical signals are output by the analog-to-digital converter after the analog-to-digital conversion, and select a fourth bias voltage of a second signal corresponding to the smallest root mean square power from the root mean square powers of the multiple second signals, and use the selected fourth bias voltage as the second bias voltage.

16. The system according to claim 15, wherein the processing module further comprises:
   a signal amplification circuit, configured to amplify the multiple first electrical signals and the multiple second electrical signals that have undergone the optical-to-electrical conversion performed by the optical-to-electrical conversion component, and send the amplified multiple first electrical signals and the amplified multiple second electrical signals to the analog-to-digital converter.

* * * * *